United States Patent Office 3,692,730
Patented Sept. 19, 1972

3,692,730
MOLD RELEASE AGENT FOR NYLON
Willard M. Sims, Leominster, Mass., assignor to Foster Grant Co., Inc., Leominster, Mass.
No Drawing. Filed Apr. 15, 1971, Ser. No. 134,415
Int. Cl. C08g 51/44
U.S. Cl. 260—32.6 N
11 Claims

ABSTRACT OF THE DISCLOSURE

The mold release properties of nylon compositions are significantly improved by incorporating about 0.01 to 5.0 parts per 100 parts of nylon of a hydrocarbon diamine having about 25 to 50 carbon atoms in the hydrocarbon chain.

BACKGROUND OF THE INVENTION

This invention concerns nylon compositions and more particularly nylon compositions having improved adhesion resistance.

Thermoplastic materials, such as nylon are widely used in fabricating articles by molding techniques. In commerical molding processes molten polymer is extruded or ram injected into a mold maintained at a temperature considerably below the melting point of the polymer by cooling means. When the molten polymer enters the mold it is quickly cooled to a temperature at which it solidifies and hardens. As the molten polymer solidifies it shrinks somewhat so that the hardened article fits more loosely in the mold and upon opening the mold it falls out or it can be easily mechanically ejected from the mold. Because of this, articles molded from thermoplastic materials can be easily mass produced.

Due to the low shrinkability of nylon relative to other thermoplastic polymers, articles molded from nylon have a tendency to stick to the inside of the mold, thus making it more difficult to produce nylon molded articles on a rapid molding cycle. This problem is compounded when the undercut surfaces of the mold have sharp angles or when the interior face of the mold has an intricate configuration. In these cases the articles must often be removed from the molds by hand. It has been observed that the problem of mold releasability is particularly acute when polycaprolactam is molded into intricately shaped articles. This is apparently due to the fact that polycaprolactam shrinks to a less degree than other nylon materials. Nylon 6,6 poly(hexamethylene adipate) which shrinks a considerably greater amount than polycaprolactam presents less of a problem when fabricating articles in molds having sharp undercut angles because upon cooling it fits loosely in the mold. But in spite of this, even articles molded from nylon 6,6 have a slight tendency to stick to the mold surfaces.

The tacky nature of nylon also presents a problem in film forming applications. In making nylon films molten nylon is cast upon a cooled roller, usually by means of an extruder. The thin nylon film solidifies immediately upon contact with the roller but has a tendency to stick to the roller, often causing the nylon film to wrinkle or tear.

In the past these problems have been somewhat overcome by the use of a combination of internal and external lubricants. Typical internal lubricants are metallic soaps, fatty alcohols and silicones. These are usually blended into the polymeric composition. In addition to these the metallic surfaces of the molds and rollers are frequently dusted during operation with lubricating materials such as sodium or potassium stearate. Combinations of such external and internal lubricants as the above considerably improve the moldability of nylon but they do not completely solve the problems of mold release, particularly when molding articles of intricate shapes from polycaprolactam in molds having sharply undercut angles.

Nylon molding compositions have now been discovered which have greatly improved molding and sheet casting properties. Articles molded from these compositions drop easily from the mold even if the mold has an intricate configuration or sharp undercut angles. In addition, when the compositions of the invention are heated to the molten state and cast onto cooled rollers to make nylon film the molten nylon has very little tendency, if any, to stick to the rollers.

Accordingly, it is an object of the present invention to present nylon compositions having improved adhesion resistance. It is another object of the invention to present nylon compositions which have improved molding properties. It is a third object to present a method of preparing nylon compositions having improved adhesion resistance and molding properties. These and other objects of the invention will become more apparent as the description proceeds.

SUMMARY OF THE INVENTION

According to the invention nylon compositions having improved adhesion resistance are prepared by incorporating one or more hydrocarbon diamines into the nylon compositions. The hydrocarbon to which is attached the amine radicals is selected from the group consisting of alkyl, alicyclic and polymethylene radicals containing about 25 to 50 and preferably 30 to 40 carbon atoms. The hydrocarbon diamine is present in an amount of about 0.01 to 5.0 and preferably about 0.10 to 2.0 parts per 100 parts of nylon in the composition. It can be blended with the nylon at any time after the completion of the polymerization.

DESCRIPTION OF THE INVENTION

The term nylon is used in its usual sense and includes all long chain polyamides having recurring amide groups as an integral part of the main polymer chain. Typical of the polyamides contemplated are those prepared by condensation of amino acids or amino acid anhydrides, such as aminocaproic acid or epsilon-caprolactam, and products of the condensation reaction between diamines and dicarboxylic acids, such as hexamethylene diamine and adipic acid. Mixtures of two or more different nylons can also be used in the preparation of the products of the invention. As noted above, the invention is particularly beneficial for improving the properties of polycaprolactam.

The term adhesion resistance is defined in the present discussion as the ability of thermoplastic materials to resist sticking to the surfaces of solid materials. These materials include, among others, metals, glass, wood and other solid polymeric materials.

The hydrocarbon diamines which can be used in the present invention are the saturated aliphatic and alicyclic diamines having 25 to 50 carbon atoms in the aliphatic hydrocarbon portion of the compound. The saturated aliphatic carbon compounds which are attached to the diamines include linear and branched chain hydrocarbons of the paraffin series. The term alicyclic carbon compounds means saturated carbocyclic compounds containing one or more rings and one or more saturated aliphatic side chains may be attached to the ring carbon atoms. The number of carbon atoms present in the hydrocarbon portion of the diamine compounds may vary from about 25 to 50 with the preferred range being about 30 to 40. There are two amine groups attached to each molecule. Examples of typical hydrocarbon diamines useable in the invention are 1,36-diamino-hexatriacontane, 1,18-diamino-9,10-dioctyl-octadecane, and 1,4-diamino-decylcyclohexane. Mixtures of diamines may also be used in preparing the compositions of the invention. The above hydrocarbon diamines are well known, commercially available compounds and the method of making them constitutes no part of the invention. One method of producing these hydrocarbon diamines is described in General Mills Corp. product description brochure No. CDS 2–67, having a publication date of Nov. 1, 1967.

Small amounts of other compounds which do not adversely affect the performance of the diamines in the invention may be present in the diamine composition. For instance commercial grades of hydrocarbon diamines often contain very small quantities of triamines and monoamines which were made as a result of side reactions and which are difficult and costly to separate from the desired hydrocarbon diamine. These compounds do not interefere with the performance of the hydrocarbon diamine as a mold release agent and accordingly need not be removed.

The hydrocarbon diamine is preferably used in amounts of about 0.01 to about 5.0% based on the weight of nylon in the composition. Nylon compositions containing more than or less than these percentages are useful for some applications, but it has been observed that compositions containing at least 0.01% hydrocarbon diamine based on the weight of nylon in the composition have the best adhesion resistance. On the other hand, the benefit realized diminishes rapidly as the concentration increases beyond about 5% and it becomes economically unfeasible to use amounts greatly in excess of this concentration. In general, less hydrocarbon diamine is needed to produce satisfactory results when the nylon composition is to be used for film forming than when it is to be used for molding. The preferred range is about 0.10 to about 2.0%, based on the weight of nylon in the composition.

The hydrocarbon diamines used in the invention have been found to have excellent lubricating properties in nylon compositions even in applications in which proper lubrication is difficult. For example, as mentioned above, polycaprolactam is a somewhat difficult nylon to adapt to rapid molding cycles, particularly when the mold has sharp undercut angles or when the article being molded has an intricate shape. This has presented such a problem that many molders will not use polycaprolactam to mold articles that have intricate shapes but, instead, will use some other nylon, such as nylon 6,6, which, because of its greater shrinkability, does not generally cause the above problem. Now, by virtue of the present invention, molders can use polycaprolactam without being so concerned about the molded article sticking to the faces of the mold.

The nylon compositions of the invention are prepared by blending the hydrocarbon diamines with the nylon after the completion of the polymerization. This can be accomplished by any desired method, such as by blending the hydrocarbon diamines with the nylon after it has been cooled and comminuted or by injecting it into the molten nylon as it leaves the reactor. In addition, it is sometimes desirable to extrude the mixture to obtain a more uniform dispersion of the hydrocarbon diamine in the nylon composition; however, this step is not usually necessary when producing general purpose nylon composition.

The invention may be practiced on a mixture of nylon materials if so desired. Thus, the hydrocarbon diamines disclosed may be used to lubricate a composition comprised of a mixture of polycaprolactam and poly(hexamethylene adipamide) if so desired. Other materials may also be incorporated into the compositions of the invention provided they are compatible with nylon. Thus, other polymeric substances such as fluorinated hydrocarbon polymers may be included in the compositions of the invention. Similiarly, filler material such as graphite may be added to the nylon compositions. Other additives such as antioxidants, dyes and plasticizers may also, of course, be included in the compositions of the invention. It is also contemplated that external lubricants may be used in molding the compositions of the invention, if so desired.

The following examples will better illustrate the invention. Parts and percentages are on a weight basis.

EXAMPLE I

One hundred parts of polycaprolactam pellets is tumbled with 0.25 part of a hydrocarbon diamine (sold by General Mills under the name Dimer Diamine and having the formula

where R is a 36 carbon hydrocarbon radical) until the hydrocarbon diamine is uniformly coated on the surfaces of the polycaprolactam pellets. The mixture is then extruded and pelletized.

Test articles having an intricate shape are molded in a laboratory injection molding machine from the hydrocarbon diamine-coated polycaprolactam pellets. The mold surfaces are dusted lightly with sodium stearate. These articles fall easily from the mold.

In contrast to this when articles are molded in the same mold from polycaprolactam which contains no hydrocarbon diamine, the molded articles have to be removed from the mold by hand.

This exaple demonstrates that the mold release properties of polycaprolactam compositions are improved by incorporating a small amount of hydrocarbon diamine into the polycaprolactam.

EXAMPLE II

A portion of the diamine-coated polycaprolactam pellets prepared in Example I are extruded onto cooled film-casting rolls which feed onto a take-up roll. The film exhibits no tendency to adhere to the surfaces of the rolls.

In contrast to this when polycaprolactam containing no hydrocarbon diamine is extruded onto the same rolls it tends to adhere to the surface of the rolls and the resulting film has a bubbly surface.

This example demonstrates the fact that the adhesion resistance of polycaprolactam is enhanced by incorporating a small quantity of a hydrocarbon diamine into the polycaprolactam.

Although the invention is described with particular reference to specific examples, it is understood that the scope of the invention is not limited thereto and that variations not inconsistent with the disclosure are contemplated. For example, as previously noted, the invention, can be practiced with nylon materials other than polycaprolactam without departing from the spirit of the invention. The scope of the invention is limited only by the breadth of the appended claims.

I claim:

1. A nylon composition comprised of a blend of nylon and about 0.01 to 5.0 parts per hundred parts of nylon of a hydrocarbon diamine selected from the group consisting of saturated aliphatic hydrocarbon diamines and alicyclic hydrocarbon diamines and mixtures of these, the hydrocarbon portion of said hydrocarbon diamine containing about 25 to 50 carbon atoms.

2. The composition of claim 1 wherein said hydrocarbon diamine is present in an amount of 0.10 to 2.0 parts per 100 parts of nylon.

3. The composition of claim 2 wherein the hydrocarbon portion of said hydrocarbon diamine contains about 30 to 40 carbon atoms.

4. The composition of claim 3 wherein said nylon is polycaprolactam.

5. A nylon composition having improved adhesion resistance comprised of a blend of nylon and about 0.01 to 5.0% based on the weight of nylon in the composition of a hydrocarbon diamine having the structure

where R is a hydrocarbon radical having 25 to 50 carbon atoms.

6. The composition of claim 5 wherein R is a hydrocarbon radical containing 36 carbon atoms.

7. The composition of claim 6 wherein said nylon is polycaprolactam.

8. A method of enhancing the adhesion resistance of nylon comprising blending into the nylon about 0.01 to 5.0 parts, per hundred parts of nylon, of a hydrocarbon diamine selected from the group consisting of saturated aliphatic hydrocarbon diamines, alicyclic hydrocarbon diamines and mixtures of these, the hydrocarbon portion of said hydrocarbon diamine containing about 25 to 50 carbon atoms.

9. The method of claim 8 wherein the hydrocarbon portion of said hydrocarbon diamine contains about 30 to 40 carbon atoms and said hydrocarbon diamine is present in an amount of about 0.10 to 2.0 parts per 100 parts of nylon.

10. A method of improving the adhesion resistance of polycaprolactam comprising incorporating 0.01 to 5.0 parts per 100 parts of polycaprolactam of a compound having the formula $$H_2NRNH_2$$

wherein R reresents a hydrocarbon radical having 25 to 50 carbon atoms.

11. The method of claim 10 wherein said compound is added to said polycaprolactam in an amount of about 0.10 to 2.0 parts per 100 parts of caprolactam and wherein R represents a hydrocarbon radical having 36 carbon atoms.

References Cited

UNITED STATES PATENTS

| 3,541,041 | 11/1970 | Hermann | 260—32.6 |
| 3,373,107 | 3/1968 | Rice | 262—8.55 |

FOREIGN PATENTS

| 246,835 | 10/1969 | U.S.S.R. |
| 940,650 | 10/1963 | Great Britain. |

LEWIS T. JACOBS, Primary Examiner

R. ZAITLEN, Assistant Examiner

U.S. Cl. X.R.

260—583 P